INVENTOR:
FRANK W. GUTZWILLER,
BY
HIS ATTORNEY.

Dec. 7, 1965  F. W. GUTZWILLER  3,222,583
CONTROL SYSTEMS
Filed March 23, 1962
2 Sheets-Sheet 2

INVENTOR:
FRANK W. GUTZWILLER,
BY Urban H. Faulkner
HIS ATTORNEY.

United States Patent Office 3,222,583
Patented Dec. 7, 1965

3,222,583
CONTROL SYSTEMS
Frank W. Gutzwiller, Auburn, N.Y., assignor to General
Electric Company, a corporation of New York
Filed Mar. 23, 1962, Ser. No. 181,947
10 Claims. (Cl. 318—246)

This invention relates to electrical control systems and more particularly to such systems for controlling the voltage applied to a load which presents a counterelectromotive force (CEMF) in accordance with the magnitude of the CEMF presented.

The control system is quite useful for battery charges, power supplies which have capacitor input filters and speed control systems for small series commutator motors, separately excited shunt motors or permanent magnet field direct current motors. Many other uses for the system are possible. However, the problem of providing speed control for series type motors is of such long standing and the systems have found such wide and ready acceptance in this area that the motor speed control application is heavily stressed in the following description.

Many types of speed control systems for commutator motors have been used but in general the systems have had disadvantages such as poor speed regulation, low efficiency and maintenance problems which leave much to be desired for use with the motors which drive standard household appliances and portable tools. As a consequence such devices have generally been either single speed or at best operate at one of several selected speeds. This problem can be overcome with control systems which use controlled rectifiers as described and claimed in my Patent No. 3,165,688 granted January 12, 1965, Serial No. 179,964 filed on March 15, 1962 entitled "Motor Control Systems," and assigned to the assignee of the present invention. The systems of the present invention represent an improvement over my previous systems from the standpoint that they can be utilized without opening or tampering with the armature and field connections of the controlled motor. Thus the systems of the present invention can be built up as a unit and any tool or appliance may be connected to the system as by the ordinary male electrical plug with which any such devices are usually equipped and the speed of the drive motor may be varied over a wide range. This feature is, of course, an advantage for use with any type load.

The systems have the additional advantage for motor control that a selected motor speed is maintained more nearly constant with varying torque requirements than possible with previously available simple systems by the expedient of using the motor CEMF due to residual field as a control parameter for the motor speed. In addition to these advantages, the systems are extremely simple and inexpensive.

In general, it is an object of the present invention to provide an improved control system incorporating the advantages described above.

A more specific object of the present invention is to provide a control system for a series motor characterized by improved speed regulation characteristics.

In carrying out the present invention a circuit is provided for controlling the voltage applied to a load which circuit includes a controllable rectifier element that may be connected in series with the load across the source of alternating current in such a manner that the load is energized by a maximum of one-half cycle of the alternating current and the portion of the alternating half cycle applied to energize the load is controlled in accordance with the difference between a reference potential and the CEMF presented by the load. Provision is made to adjust the reference potential in order to set or adjust the voltage applied to the load. For example in the motor control setting, the firing time of the controllable rectifier element is adjusted by setting a reference voltage in order to determine the speed of operation of the motor and the voltage applied to the motor is varied in accordance with the difference between the reference potential and the CEMF developed by the motor.

The novel features which are believed to be characteristic of the invention are set forth with particularity in the appended claims. The invention itself however both as to its organization and method of operation together with further objects and advantages thereof may best be understood by reference to the following description taken in connection with the accompanying drawing, in which:

Figure 1:
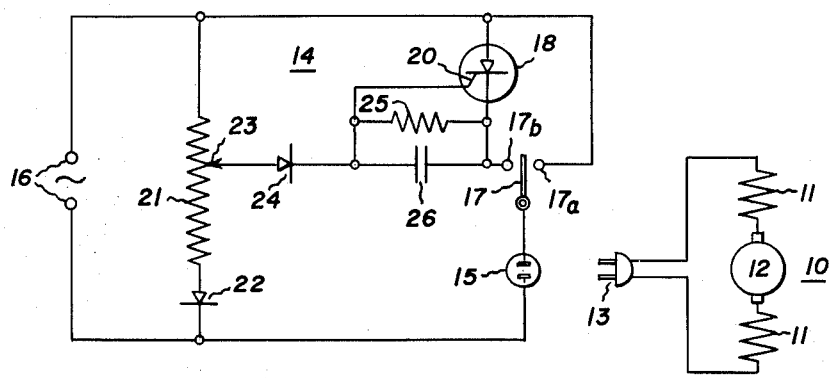
FIGURE 1 is a circuit diagram illustrating a preferred embodiment of the invention.

The purpose of the circuit of FIGURE 1 is to provide control to determine the voltage applied to a load. In the illustration the circuit provides speed control for a series or universal motor 10. The motor 10 is shown diagrammatically with its series connected field windings 11 and armature 12 in a series circuit with an ordinary male electrical plug 13 in order to emphasize the fact that the circuit and load may be separate units and that motor speed control is accomplished without breaking into motor connections between the motor field and armature winding. The control circuit 14 is provided with a receptacle 15 to receive the motor circuit plug 13 and a pair of input terminals 16 which are to be connected to a source of alternating current.

The simplest mode of operation occurs with the circuit energized, the motor plug 13 connected in the receptacle 15 of the control circuit 14 and a full speed switch 17 closed on its full speed contact 17a (right hand position in drawing). This provides a series circuit from upper circuit terminal (of pair 16) through the switch 17, through the windings of motor 10 to the lower circuit terminal (of pair 16). With this connection the motor is energized by both half cycles of the alternating current source and thus operates at full speed. Although this mode of operating is simple, it is important and is not generally available in speed control systems which require a control element such as a rectifier to be inserted between windings of the motor 10. This arrangement is especially important for motors which are not specifically designed for half-wave operation.

Figure 2:
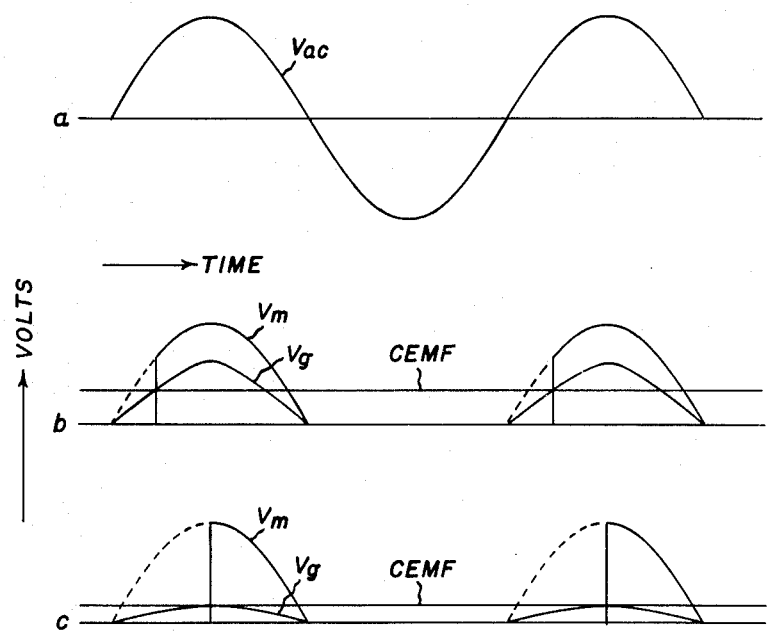
FIGURE 2 illustrates waveforms used in explaining the operation of the device with voltage plotted along the axis of abscissas and time along the axis of ordinates.

In order to exercise speed control between the maximum and minimum available speeds, the full speed switch 17 is closed on its other terminal 17b thus placing the motor 10 in a series circuit with a controlled rectifier 18. This series circuit is connected directly across the supply current terminals 16. The controlled rectifier 18, like any other rectifier, passes current only on one-half cycle (maximum) of the applied alternating current source. According to the invention the rectifier passes current only in the direction of the arrow of the rectifier symbol. The upper connection to the rectifier is considered the anode and the lower is considered the cathode. The half-cycle which may be conducted by rectifier 18 is the one which occurs when the upper terminal of input terminals 16 is positive with respect to the lower terminal. This half-cycle is considered the positive half cycle for discussion purposes. The waveforms under discussion may be seen in FIGURE 2. The source alternating voltage waveform is represented by the curve $V_{ac}$ of set $a$ and rectified half cycle is represented by curve $V_m$ of set $b$.

Operation of the controlled rectifier is described in a number of readily available sources, such as Chapter I of the General Electric Controlled Rectifier Manual, copyright 1960 by the General Electric Company; an article by Moll, Tanenbaum, Goldey and Holonyak in Proceedings of the IRE, September 1956, volume 44, pages 1174–1182; and in a copending patent application entitled "Semiconductor Devices and Methods of Making Same," Serial Number 114,788, filed June 5, 1961 in the name of Israel Arnold Lesk and assigned to the assignee of the present invention. For this reason the description of operation given here is only sufficient for an understanding of the operation of the circuits.

The speed of the motor 10 is determined by the voltage across the motor armature which in turn is determined by the portion of the positive half-cycle that the controlled rectifier 18 is conductive. The conduction period and firing angle of the controlled rectifier are determined by the magnitude and polarity of the voltage applied to the rectifier 18 through the gate lead 20 (the control element of the controlled rectifier).

In the circuit of FIGURE 1, the current applied to the gate lead depends upon the difference between a motor speed determining reference voltage and the CEMF developed by the motor. The speed setting reference voltage is provided by connecting a potentiometer 21 in series with a blocking rectifier 22 across the alternating current source terminals 16 and using the variable tap 23 of the potentiometer to select the speed setting voltage. Since the blocking rectifier 22 has the same polarity as the controlled rectifier 18, the speed setting voltage or gate voltage $V_g$ is of the same half cycle as that of the motor 10. This waveform may best be seen in FIGURE 2b. The reference or speed setting voltage is applied to the controlled rectifier by connecting the potentiometer tap 23 to the gate lead 20 through a blocking rectifier 24. The blocking rectifier 24 is provided to prevent excessive current flowing in the reverse direction in the gate lead 20 when the controlled rectifier is conducting. In this manner, the reference or speed setting voltage is compared with the CEMF of the motor 10 (best seen in FIGURE 2) through the gate lead 20 of the controlled rectifier 18. That is, the reference voltage applied at the gate lead 20 is positive with respect to the lower source terminal (of pair 16) and the CEMF due to residual field is positive at the controlled rectifier 18 relative to this same terminal. Thus, the two voltages oppose or "buck" each other. During the positive half cycle of the alternating current source, the controlled rectifier 18 is conductive (fires) when the speed setting voltage at tap 23 on potentiometer 21 is of a magnitude to overcome the sum of the voltage drop across blocking rectifier 24 and the opposing motor CEMF and still supply the critical firing voltage of the controlled rectifier 18.

Assuming the motor 10 is at a standstill and the control switch 17 is closed on its contact 17b to put the control into effect, there is initially no induced motor CEMF. Therefore, the gate voltage $V_g$ need only supply minor circuit voltage drops and the critical controlled rectifier firing voltage to cause the rectifier 18 to fire. Thus, the rectifier 18 fires early in the cycle and provides ample voltage to accelerate the motor 10. As the motor speed increases, the motor CEMF increases in proportion to the speed. As previously indicated, this voltage opposes the flow of rectifier gate current, therefore, the gate voltage $V_g$ must reach a higher value before the controlled rectifier 18 becomes conductive. This automatically causes the controlled rectifier to become conductive later in the cycle, allowing the motor 10 to reach a stable equilibrium speed selected by the speed setting reference voltage.

In order to cause the controlled rectifier 18 to become conductive early in the cycle under equilibrium conditions, the potentiometer tap 23 is set relatively high on the potentiometer 21. This causes a relatively high voltage $V_g$ to be applied to the gate 20 (as illustrated in FIGURE 2b). Thus, the critical firing voltage of controlled rectifier is reached early in the cycle and that part of the positive half cycle (voltage wave $V_m$ in FIGURE 2b) which is solid is applied to the motor. This represents a fast speed setting.

Conditions for a slower speed setting are illustrated in FIGURE 2c. The arm 23 of potentiometer 21 is moved to apply a lower voltage $V_g$ to the gate (i.e. moved down). Under these circumstances the controlled rectifier becomes conductive later in the positive half cycle and a reduced voltage (represented by solid portion of voltage wave $V_m$ in FIGURE 2c) is applied to the motor.

The circuit provides good constant speed characteristics with varying load conditions due to the fact that the conduction of the controlled rectifier is dependent upon the induced motor CEMF due to residual field and this induced voltage is proportional to the speed of the motor. When the motor is operating at a preset speed, any additional load tends to slow the motor down. This reduces the induced CEMF and causes the controlled rectifier to conduct for a greater portion of the cycle to apply additional voltage to the motor and compensate for the additional torque requirement. If a load is removed, the converse occurs.

The rectifier 22 is provided in series with the voltage reference potentiometer 21 to prevent magnetic energy stored in the motor series field 11 from discharging through the gate circuit and reduces power dissipation in the potentiometer 21. In order to improve circuit stability and eliminate motor commutator disturbance, a resistor 25 and capacitor 26 are connected in parallel around the gate 20 (i.e. between the gate and cathode) of the controlled rectifier 18.

The circuit of FIGURE 1 is capable of smooth operation over a three or four to one speed range. Where a wider range of speed control is desired, e.g. from near zero speed to essentially the same maximum speed as the circuit of FIGURE 1, the circuit of FIGURE 3 may be used. The reason that the speed control range for the circuit of FIGURE 1 is limited is that the firing angle of the controlled rectifier 18 can only be controlled in the first quarter cycle. The circuit of FIGURE 3 overcomes this disadvantage by applying a speed reference voltage for firing the controlled rectifier 18 which voltage allows the rectifier to be fired at any time (angle) during the positive half cycle of supply voltage.

Figure 3:
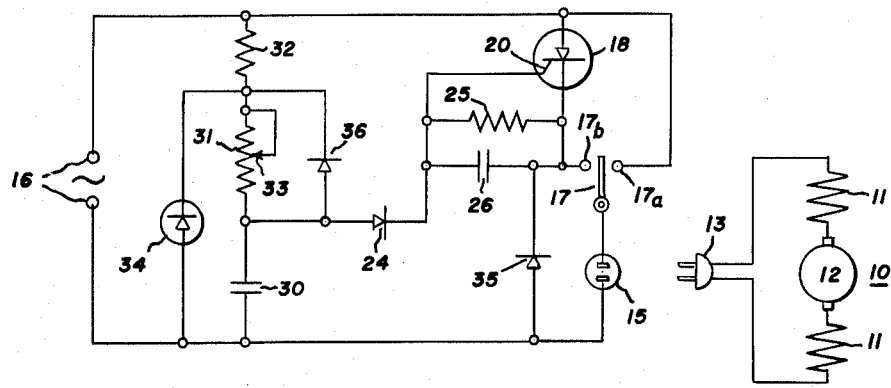
FIGURE 3 is another control circuit embodying the present invention.

Aside from this feature, the circuit of FIGURE 3 operates on the same principle as the circuit of FIGURE 1. In addition the circuits also have many common elements. In order to simplify the description and drawings, elements which are common to both circuits are given the same reference numerals. For example, the source terminals 16, the motor 10 and the full speed switch 17 and its contacts, the controlled rectifier 18 and its gate 20, male motor plug 13 and the plug receptacle 15 in the control circuit, gate circuit, rectifier 24 and the parallel circuit resistor 25 and capacitor 26 combination connected around the rectifier gate 20 are all common to both circuits and perform the same functions in essentially the same way.

Figure 4:
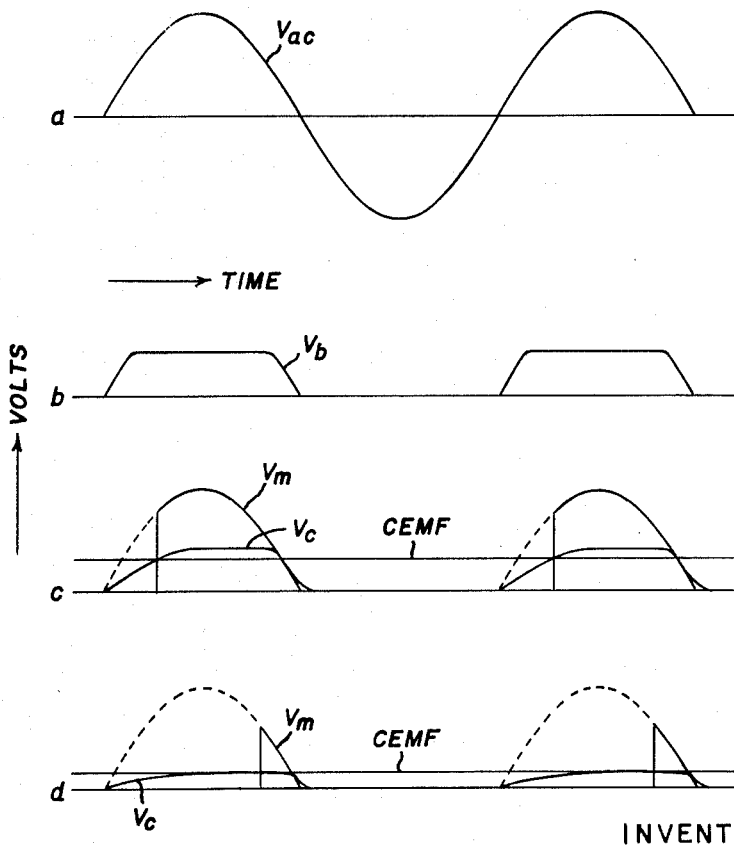
FIGURE 4 shows a series of waveforms used in describing the operation of the circuit of FIGURE 3 wherein the voltage is plotted along the axis of the abscissas and time along the axis of ordinates.

The different type of speed reference voltage is provided in the circuit of FIGURE 3 by providing a resistance-capacitance timing circuit. The circuit includes a series combination of a reference capacitor 30, a rheostat or variable resistor 31 and resistor 32 directly across the alternating current terminals. The rheostat 31 is provided with sliding tap or arm 33 which may be used to vary the value of the resistor 31 included in the circuit. The voltage waveform applied to the combination of resistor 31 and reference capacitor 30 which forms the firing circuit for the controlled rectifier 18 is clipped or shaped to a square form (see curve $V_b$ of FIGURE 4b) by a rectifier 34 of the type referred to as a zener diode which is connected around these two elements and poled to oppose the flow of current on the positive half cycle. The reverse voltage breakdown characteristics of the diode 34 is used to give the clipped voltage. That is, current flow in the reverse direction is blocked until the reverse voltage reaches a critical breakdown value. At this value reverse conduction takes place and the voltage across the device remains essentially constant until the source voltage drops below the critical value. Wave form $V_c$ of FIGURE 4c illustrates how the voltage thus applied causes an exponential voltage buildup across the capacitor 30. Since the gate lead 20 of the controlled rectifier 18 is connected directly between the reference capacitor 30 and rheostat 31, the controlled rectifier 18 fires as soon as the reference capacitor 30 charges to a value of voltage sufficient to overcome the voltage drop in the gate circuit, the critical firing voltage of controlled rectifier 18 and the residual induced voltage of the motor 10. Since the voltage across the reference capacitor 30 increases during the full positive half cycle, it can be made to overcome the opposed motor CEMF and rectifier critical firing voltage at almost any time in the positive half cycle. Thus the speed of the motor can be controlled over the full positive half cycle. Stated in a slightly different way it may be said that the voltage on the motor 10 and hence motor speed depends upon the firing angle of the controlled rectifier 18 which is in turn a function of the charging rate of the reference capacitor 30. The charging rate of reference capacitor 30 is determined by the value of resistance in series with it as set on the rheostat 31. When the arm 33 shorts out most of the resistance of the rheostat (is low) the voltage $V_c$ builds up fast across reference capacitor 30 and fires the controlled rectifier 18 early in the cycle. This represents a fast setting for motor 10. The wave forms for this condition are illustrated in FIGURE 4c.

For the slow speed setting (wave forms of FIGURE 4d) the rehostat arm 33 is set for maximum circuit resistance. Under these circumstances the voltage across reference capacitor 30 builds up slowly so that the rectifier 18 becomes conductive late in the cycle and the motor speed is therefore low.

A rectifier 35 is connected around the motor when the switch 17 is in its speed control position (position 17b) to discharge magnetic energy stored in the motor fields at the end of the positive half cycle without causing current to flow through capacitor 30 and gate 20 at the controlled rectifier 18. In order to do this job the rectifier 35 is of a polarity to conduct during the negative half cycle. In order to discharge the reference capacitor 30 during the negative half cycle of the alternating voltage source, another rectifier 36 is connected around the rheostat 31 of the gate firing circuit.

The circuit provides constant speed action with varying loads in the same manner as described with respect to the circuit of FIGURE 1. The buildup of speed to equilibrium at the speed set by the reference voltage also occurs as described with respect to the circuit of FIGURE 1. For these reasons, description of these operations is not reiterated.

While particular embodiments of the invention have been shown, it will, of course, be understood that the invention is not limited to these particular embodiments since many modifications in circuit arrangements and instrumentalities employed may be made. It is contemplated that the appended claims will cover any such modifications as fall within the true spirit and scope of the invention.

What we claim as new and desire to secure by Letters Patent of the United States is:

1. A control circuit for controlling the speed of an electric motor having series connected armature and field windings including in combination a first pair of terminals for connection to a source of alternating voltage; a second pair of terminals for connection to a motor to be controlled; a solid state controlled rectifier having an anode, a cathode, and a gate control element, said rectifier having its anode and cathode connected in a series circuit with said second pair of terminals, said series circuit connected across said first pair of terminals; and reference voltage supply means including a series circuit having a variable resistance element and a rectifier connected across said first pair of terminals, said rectifier element poled to pass the same half cycle of an alternating voltage source as said controlled rectifier element, a movable tap on said resistance element to select the magnitude of said reference voltage, said movable tap connected to said gate control element through another rectifier element poled to prevent current flow from said gate control element to said voltage source whereby said reference voltage is opposed by motor counterelectromotive force developed across said second pair of terminals due to residual motor field.

2. In a control circuit for controlling the voltage applied to a load which presents a counterelectromotive force that is dependent upon a condition of the load device which condition is responsive to applied voltage, the combination of a first pair of terminals for connection to a source of alternating voltage; a second pair of terminals for connection to the load; a solid state controlled rectifier having an anode, a cathode and a gate control element, said rectifier having its anode and cathode connected in a series circuit with said second pair of terminals, said series circuit connected across said first pair of terminals; and reference voltage supply means including a series circuit having a variable resistance element and a rectifier connected across said first pair of terminals, said rectifier element poled to pass the same half cycle of an alternating voltage source as said controlled rectifier element, a movable tap on said resistance element to select the magnitude of said reference voltage, said movable tap connected to said gate control element through another rectifier element poled to prevent current flow from said gate control element to said reference voltage source whereby said reference voltage is opposed by counterelectromotive force developed across said second pair of terminals.

3. A speed control system for an electric motor having series-connected armature and field windings including a first pair of terminals for connection to a source of alternating voltage; a second pair of terminals for connection to said series-connected armature and field windings of a motor to be controlled; a solid state controlled rectifier having an anode, a cathode and a gate control element, said rectifier having its anode and cathode in a series electrical circuit with said second pair of terminals, said series circuit connected across said first pair of terminals; and means including a resistance-capacitance timing circuit to apply a reference voltage capable of rising over substantially a full half cycle of the alternating voltage source to said gate control element whereby said reference voltage is opposed by motor counterelectromotive force developed across said second pair of terminals due to residual motor field.

4. In combination in a circuit for controlling the speed of an electric motor having series connected armature and field windings, a first pair of terminals for connection to a source of alternating voltage; a second pair of terminals for connection to said series connected armature and field windings of a motor to be controlled; a solid state controlled rectifier having an anode, a cathode, and a gate control element, said rectifier having its anode and cathode connected in a series circuit with said second pair of terminals, said series circuit connected across said first pair of terminals; and means to apply a reference voltage to said gate control element whereby said applied reference voltage is opposed by motor counterelectromotive force developed across said second pair of terminals due to residual motor field, said means to apply said reference voltage including a resistance-capacitance timing circuit for providing a voltage capable of rising over substantially a full half cycle of the alternating voltage source, said resistance of said timing circuit being variable to control the rate of rise of said voltage.

5. In a system for controlling the speed of an electric motor having series connected armature and field windings, the combination of a first pair of terminals for connection to a source of alternating voltage; a second pair of terminals for connection to a motor to be controlled; a solid state controlled rectifier having an anode, a cathode and a gate control element, said rectifier having its anode and cathode connected in a series circuit with said second pair of terminals, said series circuit connected across said first pair of terminals; and reference voltage supply means including a series combination of a resistance element, a variable resistance element and a capacitor connected across said first pair of terminals, a voltage shaping means connected across the combination of said variable resistance element and said capacitor whereby an essentially flat topped voltage wave is applied thereacross on the positive half cycle of the alternating voltage source conducted by said controlled rectifier, a rectifier means connected around at least said variable resistance element and poled to be conductive on the negative half cycle of the alternating voltage source blocked by said controlled rectifier to discharge said capacitor; and an electrical connection from the junction between said variable resistor and said capacitor to said gate control element to apply a reference voltage to said gate control element whereby said reference voltage is opposed by motor counterelectromotive force due to residual motor field.

6. A control circuit for controlling the speed of an electric motor having series-connected armature and field windings including in combination a first pair of terminals for connection to a source of alternating voltage; a second pair of terminals for connection to a motor to be controlled; a solid state controlled rectifier having an anode, a cathode, and a gate control element, said rectifier having its anode and cathode connected in a series circuit with said second pair of terminals, said series circuit connected across said first pair of terminals; and reference voltage supply means including the series combination of a resistance element, a variable resistance element and a capacitor connected across said first pair of terminals, a voltage shaping means connected across the combination of said variable resistance element and said capacitor whereby an essentially flat topped voltage wave is applied thereacross on the half cycle of the alternating voltage source conducted by said controlled rectifier, a rectifier means connected around at least said variable resistance element and poled to be conductive on the half cycle of the alternating voltage source blocked by said controlled rectifier to discharge said capacitor; and an electrical connection from the junction between said variable resistance element and said capacitor to said gate control element to apply a reference voltage to said gate control element whereby said applied reference voltage is opposed by motor counterelectromotive force due to residual motor field, said connection to said gate control element including a rectifier element poled to prevent current flow from said gate control element to said reference circuit, and a parallel resistor capacitor circuit combination connected from said gate control element to said cathode of said controlled rectifier element.

7. A control system for controlling the voltage applied to a direct current motor having a serially connected field and armature that presents a counterelectromotive force including the combination of a first pair of terminals for connection to a source of alternating voltage; a second pair of terminals for connection to said serially connected field and armature; a solid state controlled rectifier having an anode, a cathode and a gate control element, said rectifier having its anode and cathode in a series electrical circuit with said second pair of terminals, said series circuit connected across said first pair of terminals; and voltage supply means including a resistance-capacitance timing circuit to apply a reference voltage capable of rising over substantially a full half cycle of the alternating voltage source to said gate control element whereby said reference voltage is opposed by counterelectromotive force developed across said second pair of terminals due to the load, said resistance-capacitance timing circuit including a zener diode coupled thereacross to limit the voltage across said timing circuit during half cycles that said controlled rectifier may conduct.

8. In a control circuit for controlling the voltage applied to a load which presents a counterelectromotive force dependent upon a condition of the load device which condition is responsive to applied voltage, the combination of a first pair of terminals for connection to a source of alternating voltage; a second pair of terminals for connection to the load; a solid state controlled rectifier having an anode, a cathode and a gate control element, said rectifier having its anode and cathode connected in a series circuit with said second pair of terminals, said series circuit connected across said first pair of terminals; and reference voltage supply means connected across said first pair of terminals to supply a voltage to said gate control element, said reference voltage supply means including a resistance-capacitance timing circuit for providing a voltage capable of rising over substantially a full half cycle of the alternating voltage source, said resistance of said timing circuit being variable to control the rate of rise of said voltage.

9. In a control circuit for controlling the voltage applied to a load which presents a counterelectromotive force that is dependent upon a condition of the load device which condition is responsive to applied voltage, the combination of a first pair of terminals for connection to a source of alternating voltage; a second pair of terminals for connection to the load; a solid state control rectifier having an anode, a cathode and a gate control element, said rectifier having its anode and cathode connected in a series circuit with said second pair of terminals, said series circuit connected across said first pair of terminals; reference voltage supply means including a series circuit having a variable resistance element and a rectifier connected across said first pair of terminals, said rectifier element poled to pass the same half cycle of an alternating voltage source as said controlled rectifier element, a movable tap on said resistance element to select the magnitude of said reference voltage, said movable tap connected to said gate control element through another rectifier element poled to prevent current flow from said gate control element to said reference voltage source whereby said reference voltage is opposed by counterelectromotive force developed across said second pair of terminals; and switch means connected between said anode and cathode of said rectifier to selectively bypass and render said rectifier effective thereby to selectively apply both half cycles and at least a portion of one-half cycle across said second pair of terminals.

10. A speed control system for an electric motor having a series-connected armature and field windings including a first pair of terminals for connection to a source of alternating voltage; a second pair of terminals for connection to a motor to be controlled; a solid state controlled rectifier having an anode, a cathode and a gate control element, said rectifier having its anode and cathode in a series electrical circuit with said second pair of terminals, said series circuit connected across said first pair of terminals; means including a resistance-capacitance timing circuit to apply a reference voltage capable of rising over substantially a full half cycle of the alternating voltage source to said gate control element whereby said reference voltage is opposed by motor counterelectromotive force developed across said second pair of terminals due to residual motor field; a voltage limiting device coupled across said resistance-capacitance timing circuit to limit the voltage thereacross to a predetermined magnitude; and switch means connected between said anode and cathode of said rectifier to selectively bypass and render said rectifier effective thereby to selectively apply both half cycles and at least a portion of one-half cycle across said second pair of terminals.

References Cited by the Examiner
UNITED STATES PATENTS

| | | |
|---|---|---|
| 2,119,205 | 5/1938 | Doyle _____ 318—227 X |
| 2,981,880 | 4/1961 | Momberg et al. ___ 318—331 X |
| 3,045,163 | 7/1962 | Collom _____ 318—227 |
| 3,082,366 | 3/1963 | Sanders _____ 318—345 X |
| 3,103,618 | 9/1963 | Slater. |

ORIS L. RADER, *Primary Examiner.*